United States Patent
Decker et al.

[11] Patent Number: 6,128,694
[45] Date of Patent: Oct. 3, 2000

[54] METHOD OF CORRECTING IDENTIFICATION DATA STORED IN AN EEPROM

[75] Inventors: Brian J. Decker, Round Rock; Matthew B. Mendelow, Austin, both of Tex.

[73] Assignee: Dell USA, L.P., Round Rock, Tex.

[21] Appl. No.: 09/037,215

[22] Filed: Mar. 10, 1998

[51] Int. Cl.[7] ................................................. G06F 12/00
[52] U.S. Cl. .......................................... 711/103; 711/170
[58] Field of Search ................................. 711/103, 170; 713/1; 714/106; 364/186, 187

[56] References Cited

U.S. PATENT DOCUMENTS

| | | | |
|---|---|---|---|
| 5,257,380 | 10/1993 | Lang | 711/166 |
| 5,390,148 | 2/1995 | Saito | 365/185.08 |
| 5,475,693 | 12/1995 | Christopherson et al. | 714/710 |
| 5,581,723 | 12/1996 | Hasbun et al. | 711/103 |
| 5,828,862 | 10/1998 | Singkornat et al. | 711/115 |
| 5,897,663 | 4/1999 | Stancil | 711/200 |
| 5,933,847 | 8/1999 | Ogawa | 711/103 |
| 5,954,818 | 9/1999 | Dalvi et al. | 713/200 |

*Primary Examiner*—John W. Cabeca
*Assistant Examiner*—Fred F. Tzeng
*Attorney, Agent, or Firm*—Hanyes and Boone, LLP

[57] ABSTRACT

A method of correcting identification data stored in an EEPROM is described. Identification data stored in an EEPROM of a device such as a NIC is programmed into a flash ROM in which the host computer's BIOS is stored. During boot up of the host computer, the BIOS checksums the identification data stored in the EEPROM to determine whether it is valid. If the identification data is determined to be invalid, the EEPROM is reprogrammed with the identification data stored in the flash ROM. Optionally, a flag is set in a CMOS RAM for use by a network administrator to monitor the health of the EEPROM.

16 Claims, 1 Drawing Sheet

METHOD OF CORRECTING IDENTIFICATION DATA STORED IN AN EEPROM

TECHNICAL FIELD

One embodiment relates generally to identification data for computer devices and subsystems and, more particularly, to a method of correcting identification data stored in an EEPROM.

BACKGROUND

Electrically erasable programmable read-only memories, or "EEPROMs", are commonly used in computer devices and subsystems to store "tag" or identification information for the devices or subsystems. For example, a network interface controller ("NIC"), which is a device used to connect a computer to a local area network ("LAN"), typically has assigned thereto a unique media access control ("MAC") or node address that identifies the NIC to the LAN and therefore enables the NIC to communicate with the LAN. The MAC or node address of the NIC is stored in an EEPROM associated therewith. If the data stored in the EEPROM is corrupted, the NIC is not recognizable to, and hence cannot communicate with, the LAN. A PCI device ID is also stored in the EEPROM of the NIC to enable the host computer and its software drivers and operating system to communicate with the NIC subsystem.

Currently, the conventional way to "repair" a "soft" failure in an EEPROM is to remove the entire integrated circuit ("IC") chip on which it resides and replace the IC chip with a new one. Often, this means replacing the entire device with which the EEPROM is associated. The EEPROM may be reprogrammed, although it is often simply discarded. Reprogramming the EEPROM typically involves removing the motherboard and returning it to the manufacturer. Clearly, this practice is time-consuming, labor intensive, expensive, and, in cases in which the defective EEPROM is simply discarded, wasteful.

Therefore, what is needed is a method of correcting identification data stored in an EEPROM without having to remove the EEPROM from the computer in which it resides.

SUMMARY

One embodiment, accordingly, programs the identification data stored in an EEPROM of a device such as a NIC into a flash ROM in which the host computer's BIOS is stored. During boot up of the computer, the BIOS checksums the identification data stored in the EEPROM to determine whether the identification data is valid. If the identification data is determined to be invalid, the EEPROM is reprogrammed with the identification data stored in the flash ROM. Optionally, a flag is set in a CMOS RAM for use by a network administrator to monitor the health of the EEPROM.

A technical advantage is the reduction of time, energy, and expense involved in correcting identification data stored in an EEPROM.

Another technical advantage is that, when corruption of the identification data occurs, neither the EEPROM nor the device with which it is associated, such as an NIC, must necessarily be replaced before the computer can communicate with the LAN or host computer.

DESCRIPTION OF THE PREFERRED EMBODIMENT

Figure 1:
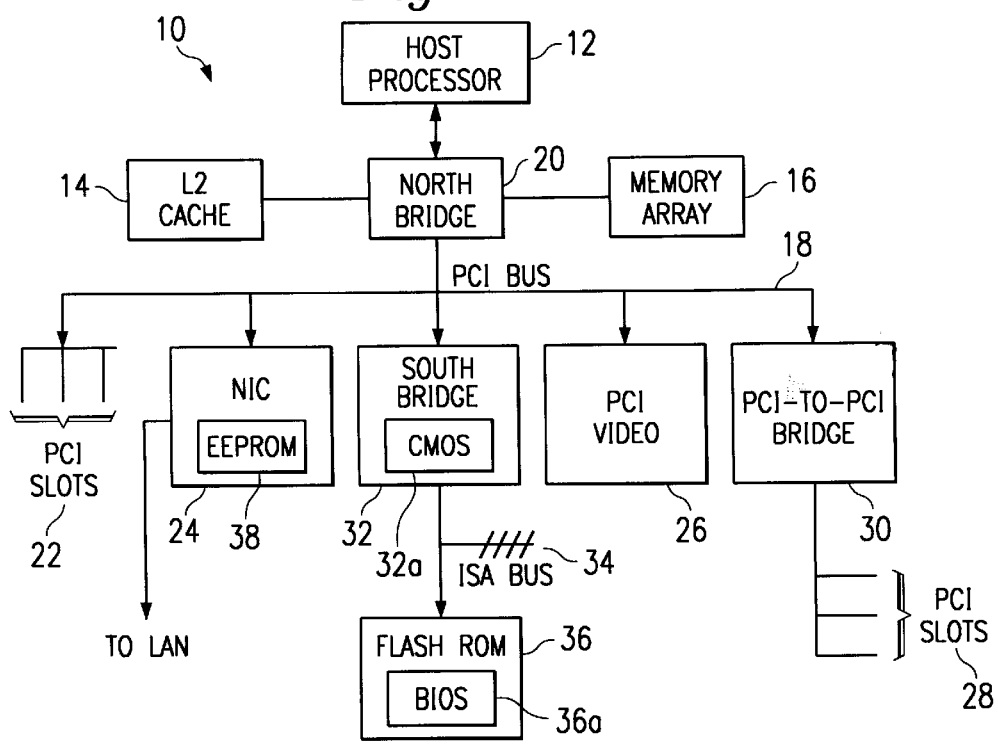
FIG. 1 is a system block diagram of a computer embodying features of one embodiment.

As shown in FIG. 1, according to one embodiment, a computer 10 includes a host processor 12, a level 2 ("L2") cache 14, and a memory array 16, all connected to a PCI bus 18 via a bridge 20. Also connected to the PCI bus 18 are a plurality of PCI slots 22, a network interface controller ("NIC") 24, and a PCI video device 26. Additional PCI slots 28, which are connected to the PCI bus 18 via a PCI-to-PCI bridge 30. An additional bridge 32, which includes a CMOS RAM 32a, serves as an interface between the PCI bus 18 and an ISA bus 34 and a flash ROM device 36 for storing the BIOS 36a for the computer 10.

As previously described, the NIC 24 can enable and control communications between the computer 10 and a local area network ("LAN") (not shown). The NIC 24 includes an EEPROM 38 in which is stored the MAC or node address and other identification data for the NIC 24 necessary for enabling communications with the LAN. The EEPROM 38 can also store the PCI device ID of the NIC 24, which is used to identify the NIC 24 on the PCI bus 18.

Figure 2:
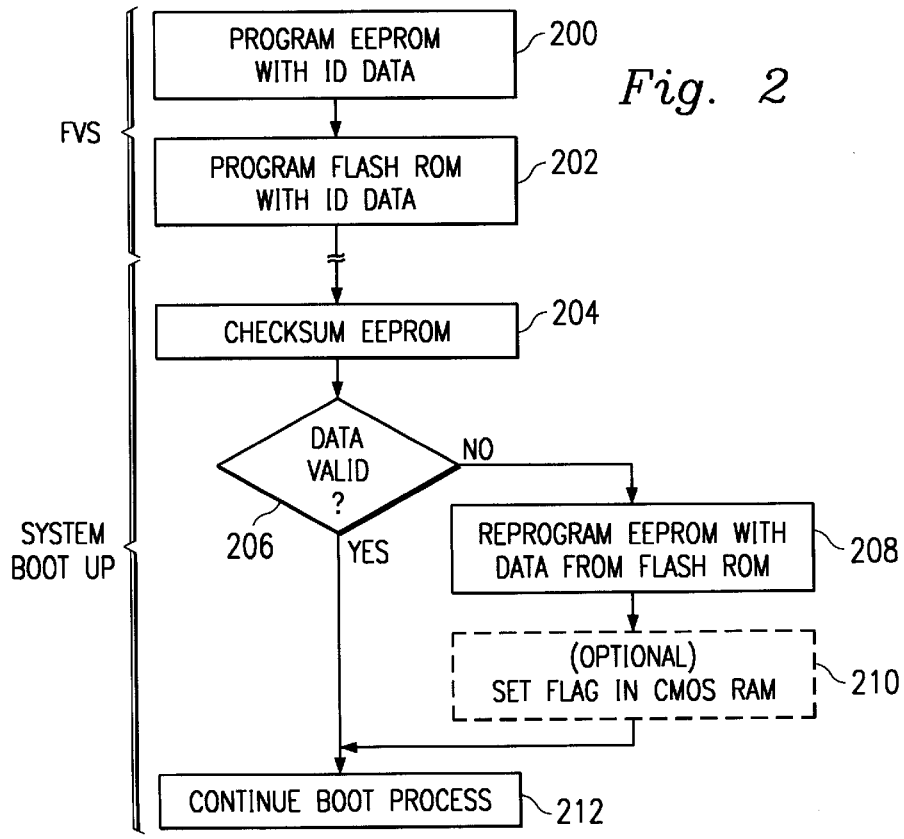
FIG. 2 is a flowchart of the operation of one embodiment.

The operation of one embodiment will now be described with reference to FIG. 2. During a functional verification system ("FVS") process, the EEPROM 38 can be programmed with identification data for the NIC 24 (step 200). In accordance with the preferred embodiment, this process is extended to program a copy of the identification data into the flash ROM 36 as well (step 202). As will be described, the identification data programmed into the flash ROM 36 is not used by the BIOS 36a or the NIC 24 unless the identification data stored in the EEPROM 38 is determined to be corrupted.

During boot-up of the computer 10, the BIOS 36a checksums the identification data stored in the EEPROM 38 (step 204) and then determines whether the identification data stored therein is valid, and hence not corrupted (step 206). If the EEPROM identification data is determined not to be valid, the BIOS 36a reprograms the EEPROM 38 with the copy of the identification data programmed into the flash ROM 36 during the FVS process (step 208). The process of the host computer's writing data to the EEPROM "on the fly" is known by those skilled in the art and is well documented in the applicable NIC and EEPROM databooks. The BIOS 36a also optionally sets a flag in the CMOS RAM 32a, which comprises part of the bridge 32, or in the flash ROM 36 itself (step 210). This flag could be returned to a system administrator using currently available system management tools, such as Dell Inspector, or some other desktop management interface ("DMI") utility in a known manner and used to determine the health of the EEPROM 38. The boot process then proceeds as usual (step 212). Similarly, if the EEPROM identification data is determined to be valid, the boot process proceeds as usual (step 212).

It will be recognized that other devices or subsystems of the computer 10, for example, the PCI video device 26, may have associated therewith an EEPROM for storing identification data therefor. The techniques described above with respect to the NIC 24 are equally applicable to such other devices or subsystems.

Although an illustrative embodiment has been shown and described, other modifications, changes, and substitutions are intended in the foregoing disclosure. Accordingly, it is appropriate that the appended claims be construed broadly and in a manner consistent with the scope of the disclosure,

What is claimed is:

1. A method of correcting identification data stored in an electrically erasable programmable read-only memory ("EEPROM") of a device or subsystem of a computer, the computer comprising a BIOS stored in a flash ROM of said computer, the method comprising:

during a functional verification system ("FVS") process, storing a copy of said device identification data in said flash ROM;

during boot-up of said computer, determining whether said device identification data stored in said EEPROM is valid;

responsive to a determination that said device identification data stored in said EEPROM is not valid, reprogramming said EEPROM using said copy of said device identification data stored in said flash ROM;

responsive to a determination that said device identification data stored in said EEPROM is valid, proceeding with the boot-up;

subsequent to said reprogramming, setting a flag in a memory device said computer; and making a status of said flag available to a system administrator.

2. The method of claim 1, wherein said memory device is said flash ROM.

3. The method of claim 1, wherein said memory device is a CMOS RAM.

4. The method of claim 1, wherein said making available is performed using a system management program.

5. The method of claim 1, wherein said determining comprises performing a checksum process on said EEPROM.

6. The method of claim 1, wherein said determining is performed by said BIOS.

7. A system for correcting identification data stored in an electrically erasable programmable read-only memory ("EBEPROM") of a device or subsystem of a computer, the computer comprising a BIOS stored in a flash ROM of said computer, the system comprising:

means for storing a copy of said device identification data in said flash ROM;

means for determining during a boot-up of the computer whether said device identification data stored in said EEPROM is valid;

means responsive to a determination that said device identification data stored in said EEPROM is not valid for reprogramming said EEPROM using said copy of said device identification data stored in said flash ROM;

means responsive to a determination that said device identification data stored in said EEPROM is valid for proceeding with the boot-up of the computer;

means for setting a flag in a memory device of said commuter subsequent to said reprogramming; and means for making a status of said flag available to a system administrator.

8. The system of claim 7, wherein said memory device is said flash ROM.

9. The system of claim 7, wherein said memory device is a CMOS RAM.

10. The system method of claim 7, wherein said means for making available comprises a system management program.

11. The system of claim 7, wherein said means for determining performs a checksum process on said EEPROM.

12. The system of claim 7, wherein said means for determining comprises said BIOS.

13. A computer including a system for correcting identification data stored in an electrically erasable programmable read-only memory ("ERPROM") of a device or subsystem of the computer, the computer comprising:

a flash ROM having stored therein a copy of said device identification data;

a system BIOS for determining during a boot-up of said computer whether said device identification data stored in said EEPROM is valid, said system BIOS for reprogramming said EEPROM using said copy of said device identification data stored in said flash ROM if said device identification data stored in said EEPROM is invalid, and for proceeding with the boot-up of said computer if said device identification data stored in said EEPROM is valid;

a memory device for storing therein a flag indicative of whether said identification data stored in said EEPROM is valid; and a system management program for making a status of said flag available to a system administrator.

14. The computer of claim 13, wherein said memory device is said flash ROM.

15. The computer of claim 13, wherein said memory device is a CMOS RAM.

16. The computer of claim 13, wherein said determining comprises performing a checksum process on said EEPROM.

* * * * *

UNITED STATES PATENT AND TRADEMARK OFFICE
CERTIFICATE OF CORRECTION

PATENT NO.   : 6,128,694
DATED        : October 3, 2000
INVENTOR(S)  : Decker, Brian J. et al.

It is certified that error appears in the above-identified patent and that said Letters Patent is hereby corrected as shown below:

Column 3,
Line 20, after "device", and before "said", insert -- of --;
Line 36, change "EBEPROM" to -- EEPROM --; and Column 4,
Line 22, change "ERPROM" to -- EEPROM --.

Signed and Sealed this

Second Day of April, 2002

Attest:

JAMES E. ROGAN
*Attesting Officer*    *Director of the United States Patent and Trademark Office*